US012654682B2

(12) United States Patent (10) Patent No.: US 12,654,682 B2
Tiziani (45) Date of Patent: Jun. 16, 2026

(54) PERSONALIZATION OF A VEHICLE BASED ON USER SETTINGS

(71) Applicant: Lodestar Licensing Group LLC, Evanston, IL (US)

(72) Inventor: Federico Tiziani, Munich (DE)

( * ) Notice: Subject to any disclaimer, the term of this patent is extended or adjusted under 35 U.S.C. 154(b) by 0 days.

(21) Appl. No.: 17/493,744

(22) Filed: Oct. 4, 2021

(65) Prior Publication Data

US 2022/0024446 A1 Jan. 27, 2022

Related U.S. Application Data

(63) Continuation of application No. 15/927,916, filed on Mar. 21, 2018, now Pat. No. 11,148,658.

(51) Int. Cl.
| | |
|---|---|
| *G06F 7/00* | (2006.01) |
| *B60K 35/10* | (2024.01) |
| *B60K 35/22* | (2024.01) |
| *B60K 35/28* | (2024.01) |
| *B60K 35/80* | (2024.01) |
| *B60K 35/85* | (2024.01) |
| *B60W 10/18* | (2012.01) |
| *B60W 10/20* | (2006.01) |
| *B60W 30/02* | (2012.01) |
| *B60K 35/60* | (2024.01) |
| *B60K 35/81* | (2024.01) |
| *G05D 1/00* | (2006.01) |

(52) U.S. Cl.
CPC ........... *B60W 30/025* (2013.01); *B60K 35/10* (2024.01); *B60K 35/22* (2024.01); *B60K 35/28* (2024.01); *B60K 35/80* (2024.01); *B60K 35/85*

(2024.01); *B60W 10/18* (2013.01); *B60W 10/20* (2013.01); *B60K 35/60* (2024.01); *B60K 35/81* (2024.01); *G05D 1/0088* (2013.01)

(58) Field of Classification Search
CPC .... B60W 30/025; B60W 10/18; B60W 10/20; G06N 3/04; G06N 3/08; G05D 1/0088
See application file for complete search history.

(56) References Cited

U.S. PATENT DOCUMENTS

| | | | |
|---|---|---|---|
| 9,147,296 B2 * | 9/2015 | Ricci ..................... | G06F 3/0622 |
| 9,817,400 B1 | 11/2017 | Poeppel et al. | |

(Continued)

FOREIGN PATENT DOCUMENTS

WO 2007046613 4/2007

OTHER PUBLICATIONS

International Search Report and Written Opinion, PCT/US2018/048390, Dec. 14, 2018.

(Continued)

*Primary Examiner* — Adam M Alharbi

(57) ABSTRACT

A vehicle is personalized to perform at least one action (e.g., control of acceleration or navigation of the vehicle) based on configuration data for a user of the vehicle. For example, when a car is rented by a user that is a driver, the car recognizes the driver and sets itself up accordingly. In some cases, an application on a mobile device of a user communicates the settings to the car when the user rents and/or hails the car. In one example, the mobile device may carry preference settings that can be downloaded to a ride-sharing vehicle or a rented vehicle to adjust controls relevant to the role of the driver.

18 Claims, 7 Drawing Sheets

(56) References Cited

U.S. PATENT DOCUMENTS

| | | | |
|---|---|---|---|
| 10,877,999 | B2 | 12/2020 | Bielby |
| 10,894,545 | B2 | 1/2021 | Bielby |
| 11,148,658 | B2 | 10/2021 | Tiziani |
| 2008/0133716 | A1 | 6/2008 | Rao et al. |
| 2013/0124009 | A1* | 5/2013 | Esler ..................... H04L 67/303 |
| | | | 701/1 |
| 2013/0204527 | A1 | 8/2013 | Schilling et al. |
| 2014/0240089 | A1* | 8/2014 | Chang ................ G06Q 30/0207 |
| | | | 340/5.61 |
| 2014/0309870 | A1* | 10/2014 | Ricci ....................... G01S 19/42 |
| | | | 701/36 |
| 2015/0370272 | A1 | 12/2015 | Reddy et al. |
| 2016/0042401 | A1 | 2/2016 | Menendez et al. |
| 2016/0070898 | A1 | 3/2016 | Kwok-Suzuki et al. |
| 2016/0104486 | A1 | 4/2016 | Penilla et al. |
| 2017/0097640 | A1 | 4/2017 | Wang et al. |
| 2017/0139411 | A1 | 5/2017 | Hartung et al. |
| 2017/0237944 | A1 | 8/2017 | Haas |
| 2017/0267256 | A1 | 9/2017 | Minster et al. |
| 2017/0309092 | A1 | 10/2017 | Rosenbaum |
| 2018/0061415 | A1* | 3/2018 | Penilla .................... G10L 15/02 |
| 2018/0096417 | A1 | 4/2018 | Cook et al. |
| 2018/0265094 | A1* | 9/2018 | Graney ................. B60K 35/00 |
| 2018/0275667 | A1 | 9/2018 | Liu et al. |
| 2018/0288605 | A1 | 10/2018 | Griffin et al. |
| 2018/0330417 | A1 | 11/2018 | Wollmer et al. |
| 2019/0049981 | A1 | 2/2019 | Fischer |
| 2019/0197177 | A1 | 6/2019 | Bielby |
| 2019/0283761 | A1 | 9/2019 | Bielby |
| 2019/0291719 | A1 | 9/2019 | Tiziani |
| 2019/0371093 | A1 | 12/2019 | Edren et al. |
| 2021/0117451 | A1 | 4/2021 | Bielby |
| 2021/0129852 | A1 | 5/2021 | Bielby |

OTHER PUBLICATIONS

Personalization of a Vehicle Based on User Setting U.S. Appl. No. 15/927,916, filed Mar. 21, 2018 Federico Tiziani Patented Case dated Apr. 15, 2021.

* cited by examiner

Identify a user 611

Retrieve, based on identifying the user, public user settings and private user settings 613

Configure, based on the public user settings and private user settings, at least one action performed by a vehicle 615

PERSONALIZATION OF A VEHICLE BASED ON USER SETTINGS

RELATED APPLICATIONS

The present application is a continuation application of U.S. patent application Ser. No. 15/927,916 filed Mar. 21, 2018, issued as U.S. Pat. No. 11,148,658 on Oct. 19, 2021, the entire disclosure of which application is hereby incorporated herein by reference.

This application is related to U.S. Non-Provisional application Ser. No. 15/921,549, filed Mar. 14, 2018, issued as U.S. Pat. No. 10,894,545 on Jan. 19, 2021, entitled "Configuration of a Vehicle Based on Collected User Data," by Robert Richard Noel Bielby, the entire contents of which application is incorporated by reference as if fully set forth herein.

This application is also related to U.S. Non-Provisional application Ser. No. 15/856,522, filed Dec. 28, 2017, issued as U.S. Pat. No. 10,906,506 on Feb. 2, 2021, entitled "Security of User Data Stored in Shared Vehicles," by Troia et al., the entire contents of which application is incorporated by reference as if fully set forth herein.

This application is also related to U.S. Non-Provisional application Ser. No. 15/848,630, filed Dec. 20, 2017, issued as U.S. Pat. No. 10,303,045 on May 28, 2019, entitled "Control of Display Device for Autonomous Vehicle," by Junichi Sato, the entire contents of which application is incorporated by reference as if fully set forth herein.

FIELD OF THE TECHNOLOGY

At least some embodiments disclosed herein relate to configuration of vehicles in general, and more particularly, but not limited to, configuring actions to be performed by a vehicle based on configuration data (e.g., public and private user settings) for a user of the vehicle (e.g., an autonomous or other vehicle).

BACKGROUND

A user of a vehicle can be a driver in the case of a manually-driven vehicle. In other cases, such as for an autonomous vehicle, the user of the vehicle typically performs fewer control actions than a "driver" as regards the operation of the vehicle. For example, in some cases, the user may simply select a destination to which the vehicle travels, but without performing any directional or other control of the immediate movement of the vehicle on the roadway.

Recent developments in the technological area of autonomous driving allow a computing system to operate, at least under some conditions, control elements of a vehicle without the assistance from a user of the vehicle. For example, sensors (e.g., cameras and radars) can be installed on a vehicle to detect the conditions of the surroundings of the vehicle on a roadway.

Preferences as to operation among vehicle users may vary dramatically. Some users may be aggressive as regards driving preferences, while other users may be more cautious. These preferences may relate to different styles, patterns, etc. as to how a vehicle is operated. In particular, autonomous vehicles according to current designs often operate in the same way regardless of the particular user of the vehicle.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
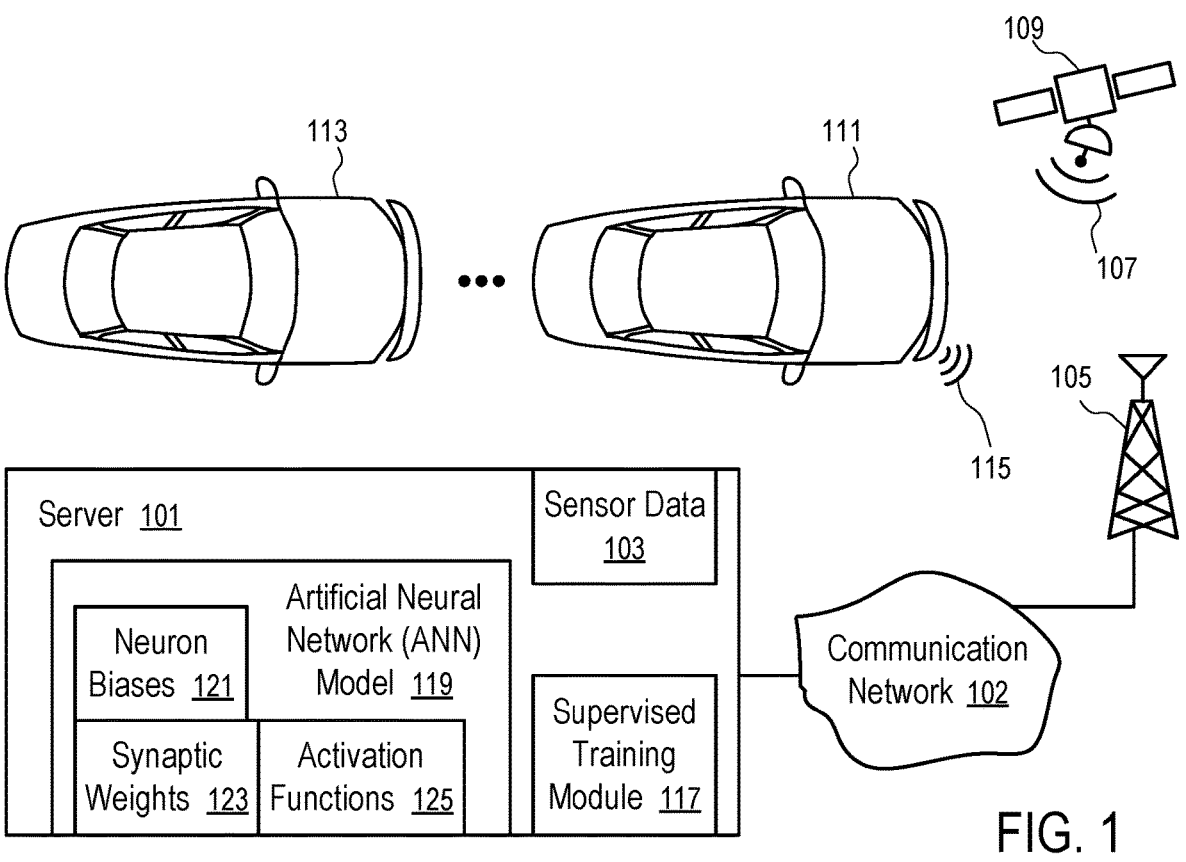
FIG. 1 illustrates a system to configure at least one action of a vehicle using configuration data for a user of the vehicle, according to one embodiment.

At least some embodiments disclosed herein configure a vehicle (e.g., that has been rented by a user) to perform at least one action in a way that is personalized for one or more preferences of the user (e.g., control of acceleration of the vehicle). For example, the vehicle can be personalized for a user of the vehicle so that operation of the vehicle is more aggressive in rate of acceleration, turning, passing, etc.

In various embodiments, the vehicle that is personalized is, for example, a manually-driven vehicle or an autonomous vehicle (e.g., a car, truck, aircraft, drone, watercraft, etc.). The configuration is based on identifying the user that is, for example, currently operating, or will be operating in the future, the vehicle.

For example, when a car is rented by a user that is a driver, the car (and/or a server associated with configuring the car or otherwise in communication with the car) recognizes the driver and sets itself up accordingly (e.g., using an over-the-air firmware update). A mobile device of the user stores the personal settings of the driver (e.g., radio settings, seat and mirror position, performance, etc.) In some cases, software (e.g., an application) on the mobile device communicates the settings to the car when the user rents and/or hails the car. In one example, the mobile device may carry preference settings that can be downloaded to a ride-sharing vehicle or a rented vehicle to adjust controls relevant to the role of the driver and/or a passenger. In one embodiment, the passenger may have its own settings that are used to configure actions specifically for the passenger in addition or alternatively to a configuration implemented for the driver.

In one embodiment, configuration data is retrieved (e.g., from the mobile device of the user) after identifying the user. The configuration data is transmitted to the vehicle and used to configure at least one action performed by the vehicle (e.g., an action to be performed in the future when the user is operating or riding in the vehicle). In some examples, the configuration can be implemented in real-time (e.g., based on new data collected regarding the user and/or via the vehicle). The configuration data can be, for example, stored in memory of the vehicle after being received by the vehicle.

In various embodiments, the user of a vehicle is identified in order to configure the vehicle for the user. In one example, the user may transmit an electronic request to the server regarding future usage of a vehicle. The receipt of the request is used to identify the user. In some cases, the user may provide authentication credentials (e.g., to a server) that are used to identify the user. In other cases, the identification of the user may be based on, for example, data collected during usage by the user of the vehicle.

In various embodiments, the configuration of one or more actions performed by the vehicle may include, for example, actions related to operation of the vehicle itself and/or operation of other system components mounted in the vehicle and/or otherwise attached to the vehicle. For example, the actions may include actions implemented via controls of an infotainment system, a window status, a seat position, and/or driving style of the vehicle. For example, the infotainment system may be configured to provide access to media of the user in a manner related to sound volume, content-playing sequence, etc. as desired by the user based on the configuration data of the user (and/or analysis of other collected data regarding the user).

In another example, the driving style of the vehicle can be configured to be, for example, aggressive or passive. An aggressive driving style can, for example, include faster acceleration and braking, and more frequent passing of other vehicles on the road.

In some embodiments, after identifying the user, public user settings and private user settings for the user are retrieved, for example, from a database and/or a mobile device of the user. At least one action performed by the vehicle is configured based on the public user settings and/or private user settings. In some cases, the public user settings may be used to configure the vehicle prior to usage of the vehicle by the user. For example, the public user settings can be used for configuring the vehicle before the user is physically present at the location of the vehicle (e.g., prior to the user physically entering a rental car or a ride-sharing vehicle).

In one embodiment, use of and/or access to the private user settings is restricted such that access to the private user settings by the vehicle does not occur until after the user is physically present at the location of the vehicle. For example, after determining that the user is physically present at the location of the vehicle, a communications link can be used to transfer private user settings to the vehicle. In one case, the private user settings are retrieved from a computing device (e.g., a mobile device) of the user via the communication link.

In some embodiments, configuration data is provided as an input to a machine learning model. The vehicle is controlled by performing one or more actions that are based on an output from the machine learning model.

In one example, a machine learning model is trained and/or otherwise used to configure a vehicle for a user (e.g., tailor actions performed by the vehicle and/or an personalize an environment of the vehicle such as its interior). For example, the machine learning model may be based on pattern matching in which prior patterns of configuration data, user behavior, and/or other user data is correlated with desired characteristics or configuration(s) for operation of the vehicle. In some cases, the machine learning model may further use driver user inputs collected during usage of the vehicle to control actions of the vehicle. For example, the driver may input selections into a user interface located in the vehicle. In some cases, configuration data for the user is updated in real-time and used as an input to the machine learning model.

In some embodiments, data is collected to create a profile for the user. In one example, the profile is stored at a cloud server (or other networked computing device) and is associated with an account of the user. In one example, the user rents a vehicle which is configured for use by the user based on the profile stored at the cloud server. The profile can be used to aid in the identification of the user. Also, at least a portion of the configuration data for the user can be provided from the profile. For example, at least a portion of public user settings and/or private user settings for the user can be stored in the profile and accessed by a server when configuring a vehicle for the user.

In other embodiments, an ANN model trained to process input data based on received configuration data of a user and/or collected data for a user may be used in one of many devices, such as in vehicles having functions for advanced driver assistance system (ADAS), in connected home devices having artificial intelligence (AI) functions, in industry 4.0 devices having AI functions for automation and data exchange in manufacturing, etc. Thus, the techniques discussed herein in connection with configuration of vehicles can also be used with other intelligent devices, such as those for network-connected homes, robots, manufacturing, etc.

It is recognized in the disclosure herein that configuration of numerous aspects of vehicle operation creates a technical problem for users of such systems and services, since proper or desired configuration for operation is otherwise difficult without significant manual effort, or in some cases not possible by manual effort. Embodiments herein provide a technological solution to improve the configuration of a vehicle, including any related systems and computing devices/servers, by providing automated functionality that effectively and more efficiently manages configuration of the vehicle (including management and storing of configuration data of the user) in ways that cannot effectively be done manually.

For example, it is not practical for a user to manually configure the numerous various aspects of operation required for many modern vehicles (e.g., autonomous vehicles). In one example, after entering the vehicle, the user has to devote much time to defining numerous vehicle settings such as, for example, temperature, seat, gear management (manual or automatic), driving style (sport, city, etc.), airflow, rear mirror position, infotainment settings (e.g., music Apple store or Google store or other, specific apps, contacts sync, preferred maps or points of interest (POI)). In other examples, different settings are needed in the case of additional passengers (e.g., video content or apps for rear passengers). In other cases, there is a need for specific identifiers (e.g., ID nos. or user names) and passwords and/or other credentials to access electronic payment (PayPal, etc.) such as, for example, when providing or obtaining certain services for the user and/or passengers.

In some embodiments, personalization of a vehicle is done using configuration data managed as two groups of user settings (e.g., public user settings and private user settings). For example, the user can decide to permit public user settings to be managed by a server (e.g., of a rental car company), but to keep other private user settings in a restricted state, in which access is made available only when the user is located at or inside the vehicle. In some cases, it is further required that the vehicle has linked with the user's mobile device prior to providing access to private user settings. In other cases, private user settings are transferred only after a specific secure user recognition has been performed (e.g., based on authentication credentials when the user is inside the vehicle).

In one embodiment, user settings (e.g., public user settings) and/or other user data can be managed by a server in a cloud system (e.g., a server operated by a rental vehicle or ride-sharing service). Other user settings, such as private user settings, and/or other restricted data are transferred to a vehicle and/or the server only when the user is securely identified as being inside the vehicle. In some cases, private user settings are transferred in response to the user permitting sharing of the settings and/or other data content (e.g., sharing of content for an infotainment system that is provided via and/or stored on the user's mobile device).

In one embodiment, a mobile device of the user communicates preferences to the vehicle wirelessly and/or using other electronic approaches (e.g., a wired connection to a USB port of the vehicle, a server, and/or other computing device). For example, a smartphone or other mobile device can communicate the user settings or data using Bluetooth, Wi-Fi, USB cable, and/or cloud links.

In one example, the vehicle is a rental car for which a secured mechanism is used to prevent access to any data content or user settings by the vehicle electronics and/or memories. In some embodiments, access to the user's data by any subsequent next user of the vehicle is prevented. For example, access to previous user data can be stored in the cloud. Access to such data by a subsequent user is blocked after determining that a present user has terminated usage of the vehicle.

In one embodiment, the vehicle to be configured is, for example, a private or semi-private vehicle (e.g., car, truck, bus, etc.) for which there are more than just a single user. For example, there may be a predetermined or limited number of users associated with the vehicle. In some cases, these are users that are authorized to use the vehicle (e.g., each user has a credential that can authenticate use of the vehicle by the user).

In one example, a family of persons owns or uses the vehicle, and the vehicle recognizes each of the persons. In some cases, this recognition is based on a portable device and/or a tag. For example, a computing device that stores keys for a person can be used to authenticate or identify the person. In some cases, the user can be recognized based on establishing an RFID or near-field communication (NFC) connection or link.

In one embodiment, a central server stores the user settings of a user. These stored settings can be, for example, based on prior usage of one or more vehicles by the user (e.g., as automatically recorded by a server, and/or based on user inputs to a user interface of the vehicle, data from a wearable device, and/or interaction with a computing device of the user (e.g., a mobile device)). Various types of user settings can be stored by the server including, for example, one or more of the following settings: interior temperature, seat position, gear management/operation/number of gears, driving style, airflow to interior, rear mirror position, infotainment settings, different settings in the case of passengers, or specific IDs and passwords to provide access to electronic payment for the user and/or a passenger. In some embodiments, the user may allow others using the same vehicle to share certain personal data of the user that has been selected by the user.

In some embodiments, a vehicle (and/or a server or computing device associated with the vehicle) recognizes a user (e.g., a driver) when the vehicle is rented. For example, this recognition can be based on a user ID and/or establishing a connection to a personal computing device and/or a tag associated with the user. In some cases, a message authentication code (MAC) can be used to authenticate data associated with a user (e.g., to confirm that the data corresponds to the user).

The user can decide (e.g., based on the user's preferences) the desired method to allow public user settings to be applied (e.g., prior to the user arriving at the location of the vehicle, the rental car service can configure the vehicle using the public user settings, for example such as based on a user car reservation login event or associated data). Once the user is determined to be inside the vehicle, a secure detection or other method can be used that permits the vehicle to access private user settings (e.g., content such as contacts, music, photo, video, PayPal ID, etc.) At least a portion of the private user settings and related data can be stored on a client device or other secure computing device associated with the user.

In one embodiment, the configuration data used to configure a vehicle includes settings related to performance of the vehicle. Examples of performance settings include one or more of the following: driving style and other ADAS preferred functions (e.g., some drivers desire full, complete ADAS mechanisms working, while other drivers prefer less-than-full ADAS functionalities such as, for example, lane detection and/or vehicle speed adjustment).

In some cases, performance settings are managed using different tools in each different vehicle (e.g., the settings are managed by user interaction with display, levers, ring, buttons, which vary for different vehicles). A driver renting a car is not able to devote one or more hours learning how those tools work. However, by using the configuration approaches described herein, a user can select in advance those settings that the user prefers based on the user's driving styles. For example, the user can enable or disable certain settings, such as for the ADAS and autonomous driving behaviors. This selection may depend on the one of many different types of vehicles that can be rented (e.g., ADAS functionalities are different if a user rents a Renault/Citroen vs. renting a BMW/Audi). This personalization is implemented using configuration data, which is generated based on user selections, etc.

In some embodiments, symbols are displayed to a user of a vehicle that has been configured. These symbols can be, for example, displayed on a dashboard of the vehicle and/or at another location (e.g., a hand-held computing device). The symbols may correspond to actions that can be performed by the vehicle (e.g., the actions are configured based on configuration data of a user). The symbols displayed to the user can, in some embodiments, be configured by the user. For example, the user can select symbols for display in advance of renting a vehicle. The symbols displayed to the user can vary based on the vehicle rented. In other cases, the symbols displayed for certain predetermined functionality of a vehicle can be the same despite the use of different vehicles. For example, individual icons and/or a configuration of two or more icons can be made to be consistently displayed across different vehicle types.

In some embodiments, a dashboard and/or computing device of the user can be used to alert the user that certain settings of the user will not work and/or are not applicable to a particular vehicle being configured for use. In one embodiment, the user is so alerted in response to a request sent from a mobile device of the user to a rental car server, where the request specifies the particular vehicle.

In some embodiments, the user will share a vehicle with other users. In such a case, the extent of sharing of public user settings and/or private user settings of the user is more limited than if the user is the only person traveling in a vehicle.

FIG. 1 illustrates a system to configure at least one action of a vehicle using configuration data for a user of the vehicle, according to one embodiment. The system uses an Artificial Neural Network (ANN) model according to one embodiment. The system of FIG. 1 includes a centralized server 101 in communication with a set of vehicles 111, . . . , 113 via a communications network 102. One of the vehicles will be configured for use by the user after identification of the user and based on configuration data retrieved for the user.

In one embodiment, data regarding a user is collected and forms at least part of the configuration data for the user. The collected data is stored, for example, in a database at a server. The collected data may be used to generate configuration data for an identified user.

In one embodiment, data regarding a user of vehicle 111 is collected from sensors located on a mobile device of the user. The collected data may optionally further include data collected from sensors located in vehicle 111 and/or another vehicle, each of which vehicles have been previously used by the user. The collected data is analyzed, for example, using a computer model such as an artificial neural network (ANN) model.

In one embodiment, the collected data is provided as an input to the ANN model. For example, the ANN model can be executed on server 101 and/or vehicle 111. The vehicle 111 is controlled based on at least one output from the ANN model. For example, this control includes performing one or more actions based on the output. These actions can include, for example, control of steering, braking, acceleration, and/ or control of other systems of vehicle 111 such as an infotainment system and/or communication device.

In one embodiment, vehicle 111 is an electric vehicle. Data can be collected from the vehicle by sensors that monitor physical activity of the user inside the vehicle.

In one embodiment, the server 101 includes a supervised training module 117 to train, generate, and update ANN model 119 that includes neuron biases 121, synaptic weights 123, and activation functions 125 of neurons in a network used for processing configuration data of a user and/or sensor data generated in the vehicles 111, . . . , 113. One or more of these vehicles can be, for example, previously driven by the user.

Once the ANN model 119 is designed, trained and implemented, e.g., for autonomous driving and/or advanced driver assistance system, the ANN model 119 can be deployed on one or more of vehicles 111, . . . , 113 for real world usage by the user.

In various embodiments, the ANN model is trained using collected user data. The training can be performed on a server and/or the vehicle. Configuration for an ANN model as used in a vehicle can be updated based on the training (e.g., by sending configuration data for a user to the vehicle). The training can be performed in some cases while the vehicle is being operated.

Typically, the vehicles 111, . . . , 113 have sensors, such as a visible light camera, an infrared camera, a LIDAR, a RADAR, a sonar, and/or a set of peripheral sensors. The sensors of the vehicles 111, . . . , 113 generate sensor inputs for the ANN model 119 in autonomous driving and/or advanced driver assistance system to generate operating instructions, such as steering, braking, accelerating, driving, alerts, emergency response, etc.

During the operations of the vehicles 111, . . . , 113 in their respective service environments, the vehicles 111, . . . , 113 encounter items, such as events or objects, that are captured in the sensor data. The ANN model 119 is used by the vehicles 111, . . . , 113 to provide the identifications of the items to facilitate the generation of commands for the operations of the vehicles 111, . . . , 113, such as for autonomous driving and/or for advanced driver assistance.

For example, a vehicle 111 may communicate, via a wireless connection 115 to an access point (or base station) 105, with the server 101 to submit the sensor input to enrich the sensor data 103 as an additional dataset for machine learning implemented using the supervised training module 117. The wireless connection 115 may be made via a wireless local area network, a cellular communications network, and/or a communication link 107 to a satellite 109 or a communication balloon. In one example, user data collected from a vehicle can be similarly transmitted to the server.

Optionally, the sensor input stored in the vehicle 111 may be transferred to another computer for uploading to the centralized server 101. For example, the sensor input can be transferred to another computer via a memory device, such as a Universal Serial Bus (USB) drive, and/or via a wired computer connection, a Bluetooth or Wi-Fi connection, a diagnosis tool, etc.

Periodically, the server 101 runs the supervised training module 117 to update the ANN model 119 based on updated collected data regarding the user. The server 101 may use the sensor data 103 enhanced with the sensor inputs from the vehicle 111 based on prior operation by the user and/or from similar vehicles e.g., 113 that are operated in the same geographical region or in geographical regions having similar traffic conditions to generate a customized version of the ANN model 119 for the vehicle 111.

Optionally, the server 101 uses the sensor data 103 enhanced with the sensor inputs from a general population of vehicles e.g., 111, 113 to generate an updated version of the ANN model 119.

The updated ANN model 119 can be downloaded to the vehicle of the user (e.g., vehicle 111 via the communications network 102), the access point (or base station) 105, and communication links 115 and/or 107 as an over-the-air update of the firmware/software of the vehicles (e.g., vehicle 111).

Optionally, the vehicle 111 has a self-learning capability. After an extended period on the road, the vehicle 111 may generate a new set of synaptic weights 123, neuron biases 121, activation functions 125, and/or neuron connectivity for the ANN model 119 installed in the vehicle 111 using the sensor inputs it collected and stored in the vehicle 111. As an example, the centralized server 101 may be operated by a factory, a producer or maker of the vehicles 111, . . . , 113, or a vendor of the autonomous driving and/or advanced driver assistance system for vehicles 111, . . . , 113.

Figure 2:
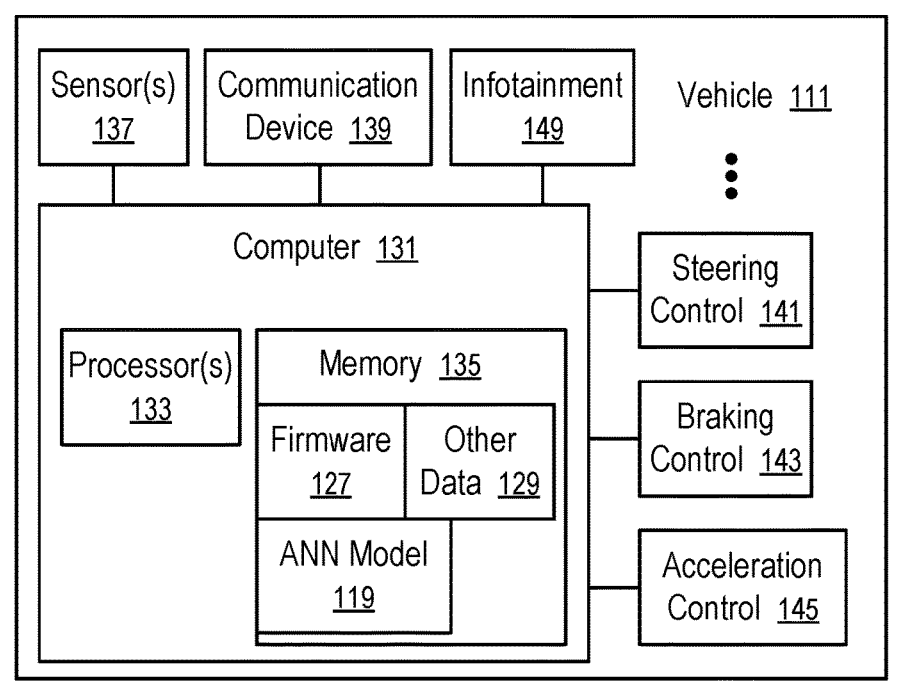
FIG. 2 shows an example of a vehicle configured using an Artificial Neural Network (ANN) model trained using configuration data of a user of the vehicle, according to one embodiment.

FIG. 2 shows an example of a vehicle configured using an Artificial Neural Network (ANN) model trained and/or updated using configuration data of a user of the vehicle, according to one embodiment. In other embodiments, the ANN model is not required and the controls or other operations of the vehicle are updated using, for example, a firmware update loaded to memory of the vehicle. The firmware update can be based, for example, on configuration data for a user. In other cases, configuration data is transmitted to vehicle 111 to provide data content for the user (e.g., for an infotainment system).

The vehicle 111 of FIG. 2 includes an infotainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc.

The computer 131 of the vehicle 111 includes one or more processors 133, memory 135 storing firmware (or software) 127, the ANN model 119 (e.g., as illustrated in FIG. 1), and other data 129.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip.

The identification or classification of the event or object generated by the ANN model 119 can be used by an autonomous driving module of the firmware (or software) 127, or an advanced driver assistance system, to generate a response. The response may be a command to activate and/or adjust one of the vehicle controls 141, 143, and 145.

In one embodiment, the generated response is an action performed by the vehicle where the action has been configured based on configuration data of the user (e.g., private and/or public user settings). Prior to generating the response, the vehicle of the user is configured. In one embodiment, the configuration of the vehicle is performed by updating firmware of vehicle 111 based on collected user data. In one embodiment, the configuration of the vehicle includes updating of the computer model stored in vehicle 111 e.g., ANN model 119.

The server 101 stores the received sensor input as part of the sensor data 103 for the subsequent further training or updating of the ANN model 119 using the supervised training module 117.

When an updated version of the ANN model 119 is available in the server 101, the vehicle 111 may use the communication device 139 to download the updated ANN model 119 for installation in the memory 135 and/or for the replacement of the previously installed ANN model 119.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving or provision of advanced driver assistance.

Typically, when the ANN model is generated, at least a portion of the synaptic weights 123 of some of the neurons in the network is updated. The update may also adjust some neuron biases 121 and/or change the activation functions 125 of some neurons. In some instances, additional neurons may be added in the network. In other instances, some neurons may be removed from the network.

In one example, data obtained from a sensor may be an image or video that captures an event and/or an object using a camera that images using lights visible to human eyes, or a camera that images using infrared lights, or a sonar, radar, or LIDAR system. In one embodiment, audio data and/or image data obtained from at least one sensor of vehicle 111 is part of the collected user data that was analyzed. In some instances, the ANN model is configured for a particular vehicle 111 based on the sensor and other collected data.

Figure 3:
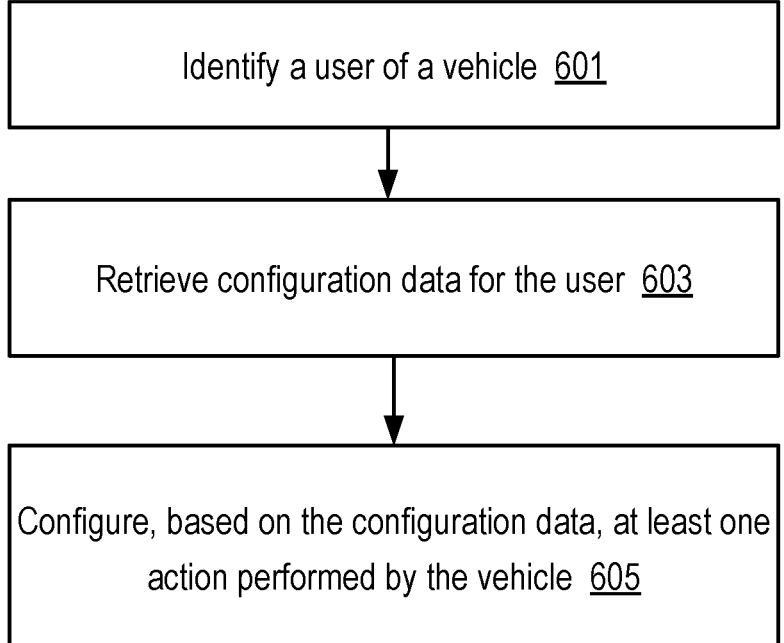
FIG. 3 shows a method to configure at least one action performed by a vehicle based on configuration data for a user, according to one embodiment.

FIG. 3 shows a method to configure at least one action performed by a vehicle based on configuration data for a user, according to one embodiment. In block 601, a user of a vehicle is identified (e.g., a user of vehicle 111). In block 603, configuration data for the user is retrieved (e.g., the configuration data is generated based on collected user data, the configuration data is generated based on training a computer model, and/or the configuration data is retrieved from a database). In block 605, at least one action performed by a vehicle (e.g., driving control or control of infotainment system 149) is configured based on the configuration data retrieved for the user.

In one embodiment, a method includes: identifying, by at least one processor, a user of a vehicle; retrieving, by the at least one processor, configuration data for the user; and configuring, based on the configuration data, at least one action performed by the vehicle.

In one embodiment, retrieving the configuration data comprises retrieving first data from a mobile device of the user.

In one embodiment, configuring the at least one action comprises sending the first data to the vehicle. For example, the first data can include private user settings and/or data content of the user. In one embodiment, the at least one action is configured based on the first data.

In one embodiment, the method further includes generating an authorization for usage of the vehicle by the user, wherein configuring the at least one action is performed after generating the authorization.

In one embodiment, the method further comprises: prior to generating the authorization for usage of the vehicle, storing the configuration data on memory at a server; and after generating the authorization for usage of the vehicle, sending, by the server, the configuration data to the vehicle for loading into memory of the vehicle.

In one embodiment, the method further comprises sending an electronic notification regarding the authorization to a mobile device of the user.

In one embodiment, the method further comprises receiving, from a computing device of the user, a request for the vehicle, wherein configuring the at least one action is performed in response to the request.

In one embodiment, configuring the at least one action comprises causing loading of the configuration data into memory of the vehicle.

In one embodiment, the method further comprises: receiving a notification regarding termination of usage of the vehicle by the user; and in response to receiving the notification, causing the vehicle to delete private user settings of the user from memory of the vehicle.

Figure 4:
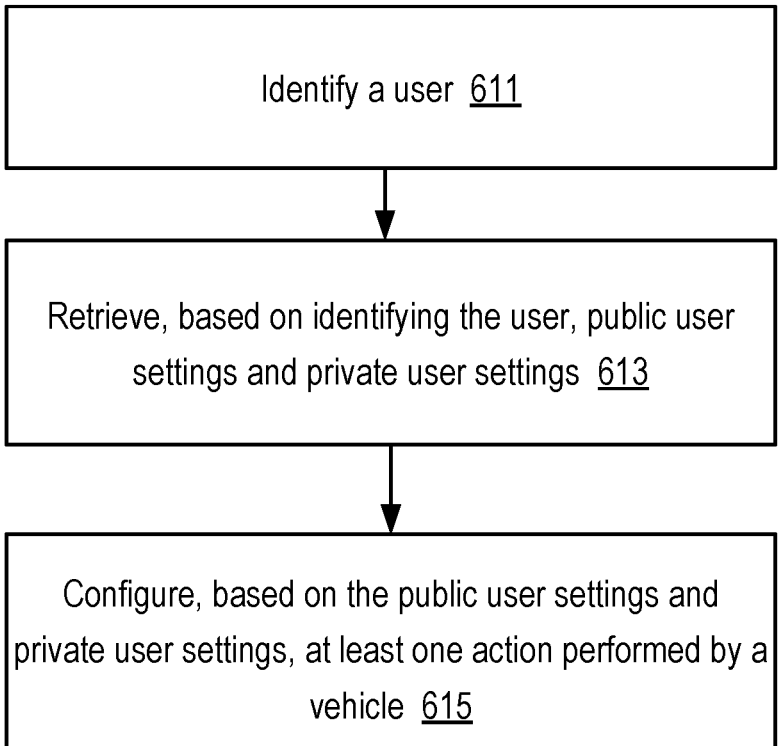
FIG. 4 shows a method to configure a vehicle, including at least one action performed by the vehicle, based on user settings, according to one embodiment.

FIG. 4 shows a method to configure a vehicle, including at least one action performed by the vehicle, based on user settings, according to one embodiment. In block 611, a user is identified. For example, one or more sensors incorporated into a mobile device of the user and/or the vehicle can be used to identify the user.

In block 613, user settings are retrieved based on identifying the user. The user settings include public user settings and private user settings.

In block 615, an action performed by a vehicle is configured based on the public user settings and private user settings. For example, the configuration data provided to and/or stored in the vehicle can include both public user settings and private user settings. In another case, the configuration data is sent to a vehicle in two steps or portions. In the first step, only public user settings and/or other related unrestricted data is sent to the vehicle. In a second step, private user settings (and/or other private data of the user) are provided to the vehicle.

In one embodiment, a system includes: at least one processor; and memory storing instructions configured to instruct the at least one processor to: identify a user; retrieve, based on identifying the user, public user settings and private user settings; and configure, based on the public user settings and the private user settings, at least one action performed by a vehicle.

In one embodiment, the instructions are further configured to instruct the at least one processor to determine that the user is physically located at or in the vehicle, and wherein the private user settings are retrieved only after determining that the user is physically located at or in the vehicle.

In one embodiment, configuring the at least one action based on the public user settings is performed prior to determining that the user is physically located at or in the vehicle.

In one embodiment, the instructions are further configured to instruct the at least one processor to link with a computing device of the user, and wherein retrieving the private user settings is performed after linking with the computing device.

In one embodiment, the instructions are further configured to instruct the at least one processor to authenticate a computing device of the user, and wherein the private user settings are used to configure the at least one action only after authenticating the computing device.

In one embodiment, the instructions are further configured to instruct the at least one processor to receive input provided via a user interface of a computing device of the user, the input to identify at least one setting of the user to manage as part of the private user settings.

In one embodiment, the instructions are further configured to instruct the at least one processor to display at least one symbol to the user when in the vehicle, the at least one symbol corresponding to the at least one action.

In one embodiment, the instructions are further configured to instruct the at least one processor to, after retrieving at least one of the public user settings or the private user settings, provide a notification via at least one of a computing device of the user or a display of the vehicle that at least one user setting is not supported by the vehicle.

In one embodiment, the instructions are further configured to instruct the at least one processor to, prior to retrieving the private user settings, authenticate a computing device of the user, the authentication using at least one key stored on the computing device.

In one embodiment, a non-transitory computer storage medium stores instructions which, when executed on a computing device, cause the computing device to: identify a user of a vehicle; obtain configuration data for the user, the configuration data including public user settings and private user settings; and configure, based on the configuration data, at least one action performed by the vehicle, wherein the private user settings are used to configure the at least one action only after determining that the user is physically located at or in the vehicle.

Figure 5:
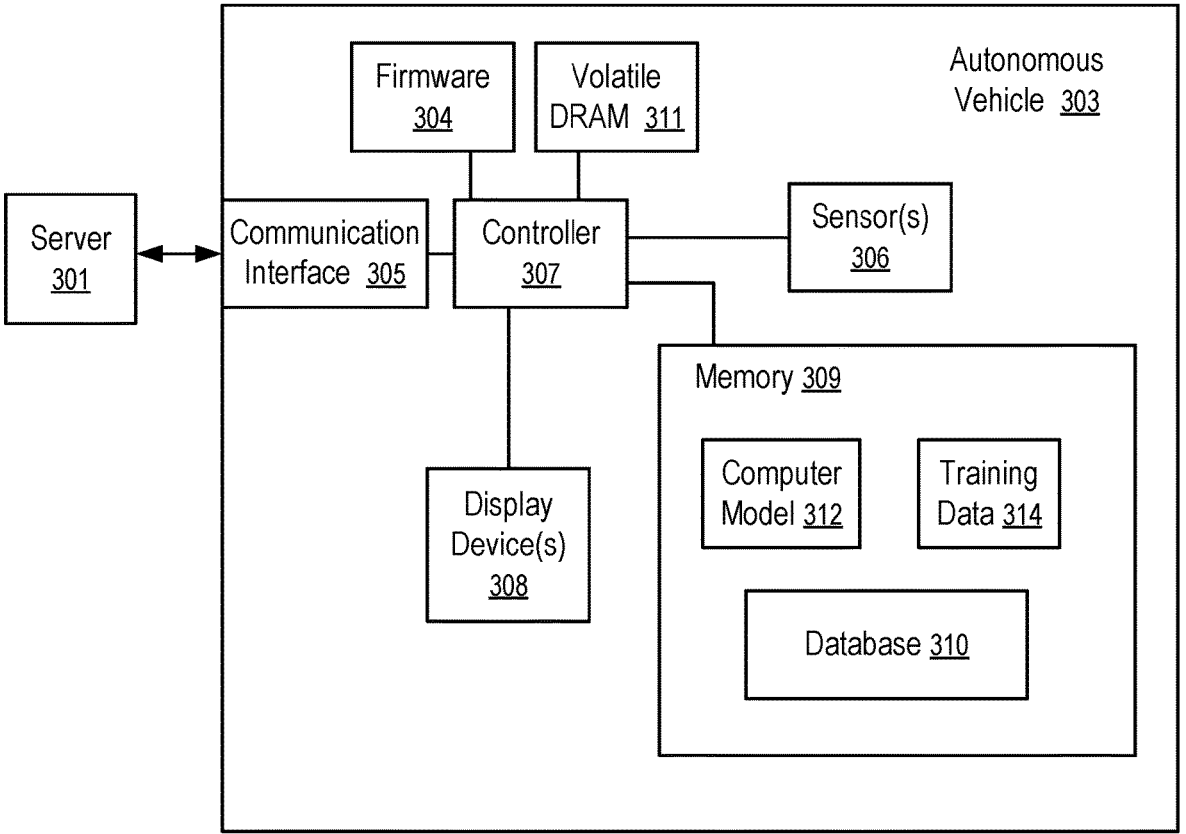
FIG. 5 shows an autonomous vehicle configured based on configuration data and controlled using a computer model, according to one embodiment.

FIG. 5 shows an autonomous vehicle configured based on configuration data and controlled using a computer model, according to one embodiment. At least a portion of the configuration data (or collected data used to generate or derive configuration data) for a user is collected from the vehicle itself. In one embodiment, a system controls a display device 308 (or other device, system, or component) of an autonomous vehicle 303. For example, a controller 307 controls the display of images on one or more display devices 308. For examples, symbols corresponding to configured actions can be displayed.

The controller 307 may receive data collected by one or more sensors 306. The sensors 306 may be, for example, mounted in the autonomous vehicle 303. The sensors 306 may include, for example, a camera, a microphone, a motion detector, and/or a camera. The sensors 306 also may include, for example, sensors incorporated in wearable devices worn by the driver and/or passengers in the autonomous vehicle 303.

The sensors 306 may provide various types of data for collection by the controller 307. For example, the collected data may include image data from the camera and/or audio data from the microphone. The collected data may be used to generate and/or provide at least a portion of the configuration data (which may be sent to server 301 for storage).

In one embodiment, the image data includes images of one or more faces of the driver and/or passengers (any one person of which can be a future user of vehicle 303 of FIG. 5 and/or a future user of vehicle 111 of FIG. 1). In another embodiment, the collected data includes biometric data for one or more persons in the autonomous vehicle 303. The biometric data may be provided, for example, by a wearable device. In one embodiment, the display device 308 is an electroluminescent display (ELD).

In one embodiment, the controller 307 analyzes the collected data from the sensors 306 (and/or other collected data regarding a user). The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309.

In one embodiment, memory 309 stores a database 310, which may include data collected by sensors 306 and/or data received by a communication interface 305 from a computing device, such as, for example, server 301 (server 301 can be, for example, server 101 of FIG. 1 in some embodiments). In one example, this communication may be used to wirelessly transmit collected data from the sensors 306 to the server 301. The received data may include configuration, training, and other data used to configure control of the display devices 308 (or other vehicle operations) by controller 307.

For example, the received data may include data collected from sensors of autonomous vehicles other than autonomous vehicle 303. This data may be included, for example, in training data 314 for training of the computer model 312. The received data may also be used to update a configuration of a machine learning model stored in memory 309 as computer model 312.

In FIG. 5, firmware 304 controls, for example, the operations of the controller 307 in controlling the display devices 308. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307.

In one embodiment, memory 309 is implemented using various memory/storage technologies, such as NAND gate based flash memory, phase-change memory (PCM), magnetic memory (MRAM), resistive random-access memory, and 3D XPoint, such that the memory 309 is non-volatile and can retain data stored therein without power for days, months, and/or years.

In one embodiment server 301 communicates with the communication interface 305 via a communication channel. In one embodiment, the server 301 can be a computer having one or more Central Processing Units (CPUs) to which vehicles, such as the autonomous vehicle 303, may be connected using a computer network. For example, in some implementations, the communication channel between the server 301 and the communication interface 305 includes a computer network, such as a local area network, a wireless local area network, a cellular communications network, or a broadband high-speed always-connected wireless communication connection (e.g., a current or future generation of mobile network link).

In one embodiment, the controller 307 performs data intensive, in-memory processing using data and/or instructions organized in memory 309 or otherwise organized in the autonomous vehicle 303. For example, the controller 307 can perform a real-time analysis of a set of data collected and/or stored in the autonomous vehicle 303. In some embodiments, the set of data further includes collected user data obtained from server 301.

At least some embodiments of the systems and methods disclosed herein can be implemented using computer instructions executed by the controller 307, such as the firmware 304. In some instances, hardware circuits can be used to implement at least some of the functions of the firmware 304. The firmware 304 can be initially stored in non-volatile storage media, such as by using memory 309, or another non-volatile device, and loaded into the volatile DRAM 311 and/or the in-processor cache memory for execution by the controller 307. In one example, the firmware 104 can be configured to use the techniques discussed herein for controlling display or other devices of a vehicle as configured based on collected user data.

Figure 6:
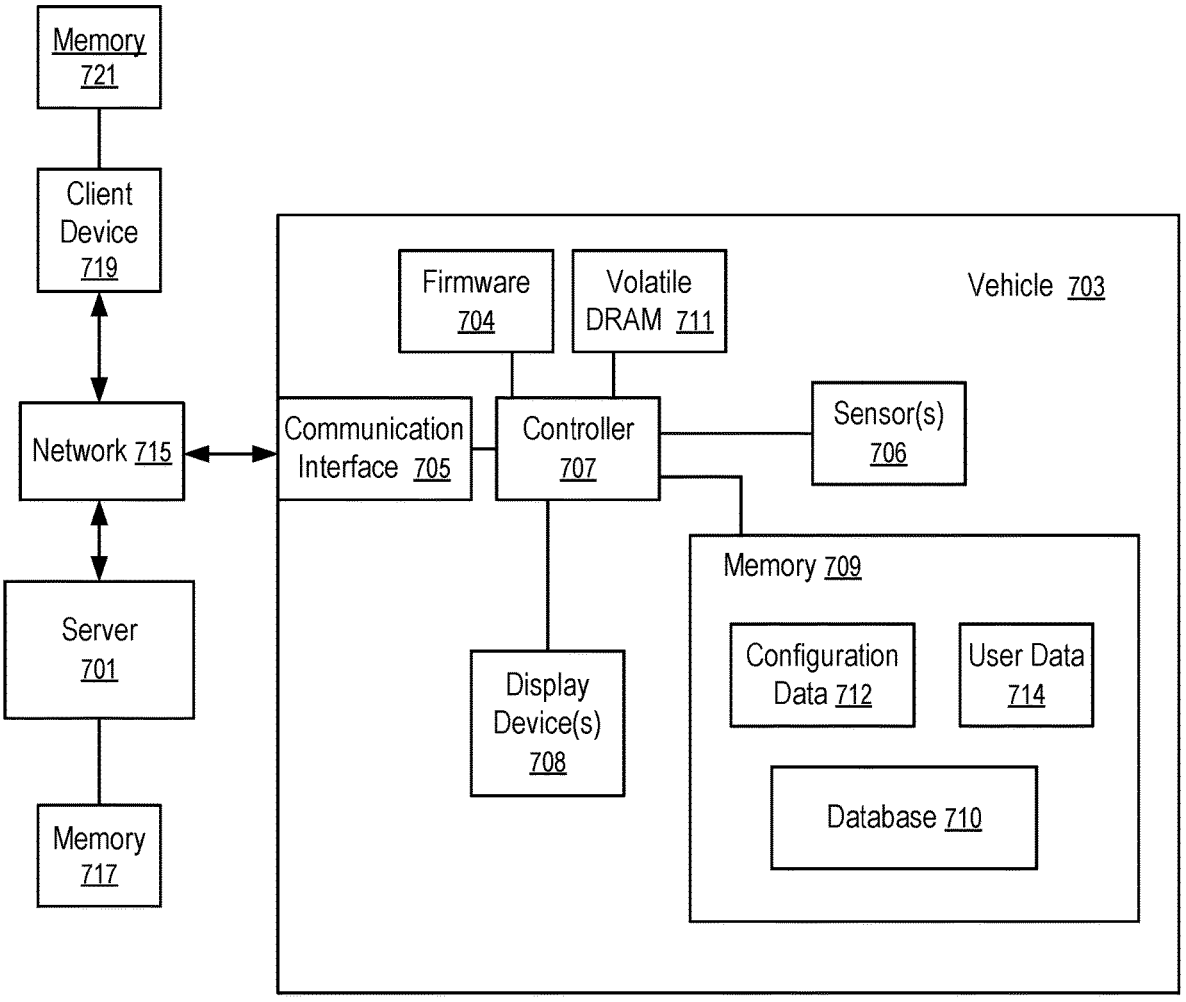
FIG. 6 shows a vehicle configured for a user based on configuration data of the user, according to one embodiment.

FIG. 6 shows a vehicle configured for a user based on configuration data of the user, according to one embodiment. The vehicle 703 includes a communication interface 705 used to receive a configuration update (e.g., configuration data that has been retrieved for a user), which can be, for example, based at least in part on analysis of collected user data. For example, the update can be received from server 701 and/or client device 719 (e.g., a mobile device of the user of the vehicle).

Communication amongst two or more of the vehicle 703, a server 701, and a client device 719 can be performed over a network 715 (e.g., a wireless network). This communication is performed using communication interface 705.

In one embodiment, the server 701 controls the loading of user data (e.g., configuration data for an identified user) of the user into the memory 709 of the vehicle. In one embodiment, data associated with usage of vehicle 703 is stored in a memory 721 of client device 719.

A controller 707 controls one or more operations of the vehicle 703. For example, controller 707 controls user data 714 stored in memory 709. Controller 707 also controls loading of updated configuration data into memory 709 and/or other memory of the vehicle 703. Controller 707 also controls display of information on display device(s) 708. Sensor(s) 706 provide data regarding operation of the vehicle 703. At least a portion of this operational data can be communicated to the server 701 and/or the client device 719.

Memory 709 can further include, for example, configuration data 712 and/or database 710. Configuration data 712 can be, for example, data associated with operation of the vehicle 703 as provided by the server 701. The configuration data 712 can be, for example, based at least in part on collected user data.

Database 710 can store, for example, configuration data for a user and/or data collected by sensors 706. Database 710 also can store, for example, navigational maps and/or other data provided by the server 701.

In one embodiment, when a vehicle is being operated, data regarding activity of vehicle 703 can be communicated to server 701. This activity may include navigational and/or other operational aspects of the vehicle 703 (e.g., as used by a user for which data is being collected).

As illustrated in FIG. 6, controller 707 also may control the display of images on one or more display devices 708. Display device 708 can be a liquid crystal display. The controller 707 may receive data collected by one or more sensors 706. The sensors 706 may be, for example, mounted in the vehicle 703. The sensors 706 may include, for example, a camera, a microphone, a motion detector, and/or a camera.

The sensors 706 may provide various types of data for collection by the controller 707. For example, the collected data may include image data from the camera and/or audio data from the microphone.

In one embodiment, the image data includes images of one or more faces of the driver and/or passengers. In another embodiment, the collected data includes biometric data for one or more persons in the vehicle 103. The biometric data may be provided, for example, by a wearable device.

In one embodiment, the controller 707 analyzes the collected data from the sensors 706. The analysis of the collected data includes providing some or all of the collected data to server 701.

In one embodiment, server 701 analyzes collected data associated with a user of vehicle 703. Configuration data is generated based on the analysis and then sent to vehicle 703. The configuration data is retrieved using an identity that is determined for a user of the vehicle.

In one embodiment, memory 709 stores database 710, which may include data collected by sensors 706 and/or data received by communication interface 705 from a computing device, such as, for example, server 701. For example, this communication may be used to wirelessly transmit collected data from the sensors 706 to the server 701. The data received by the vehicle may include configuration or other data used to configure control of the display devices 708 by controller 707.

In FIG. 6, firmware 704 controls, for example, the operations of the controller 707. The controller 707 also can, for example, run the firmware 704 to perform operations responsive to communications from the server 701.

The vehicle 703 includes volatile Dynamic Random-Access Memory (DRAM) 711 for the storage of run-time data and instructions used by the controller 707 to improve the computation performance of the controller 707 and/or provide buffers for data transferred between the server 701 and memory 709. DRAM 711 is volatile.

Figure 7:
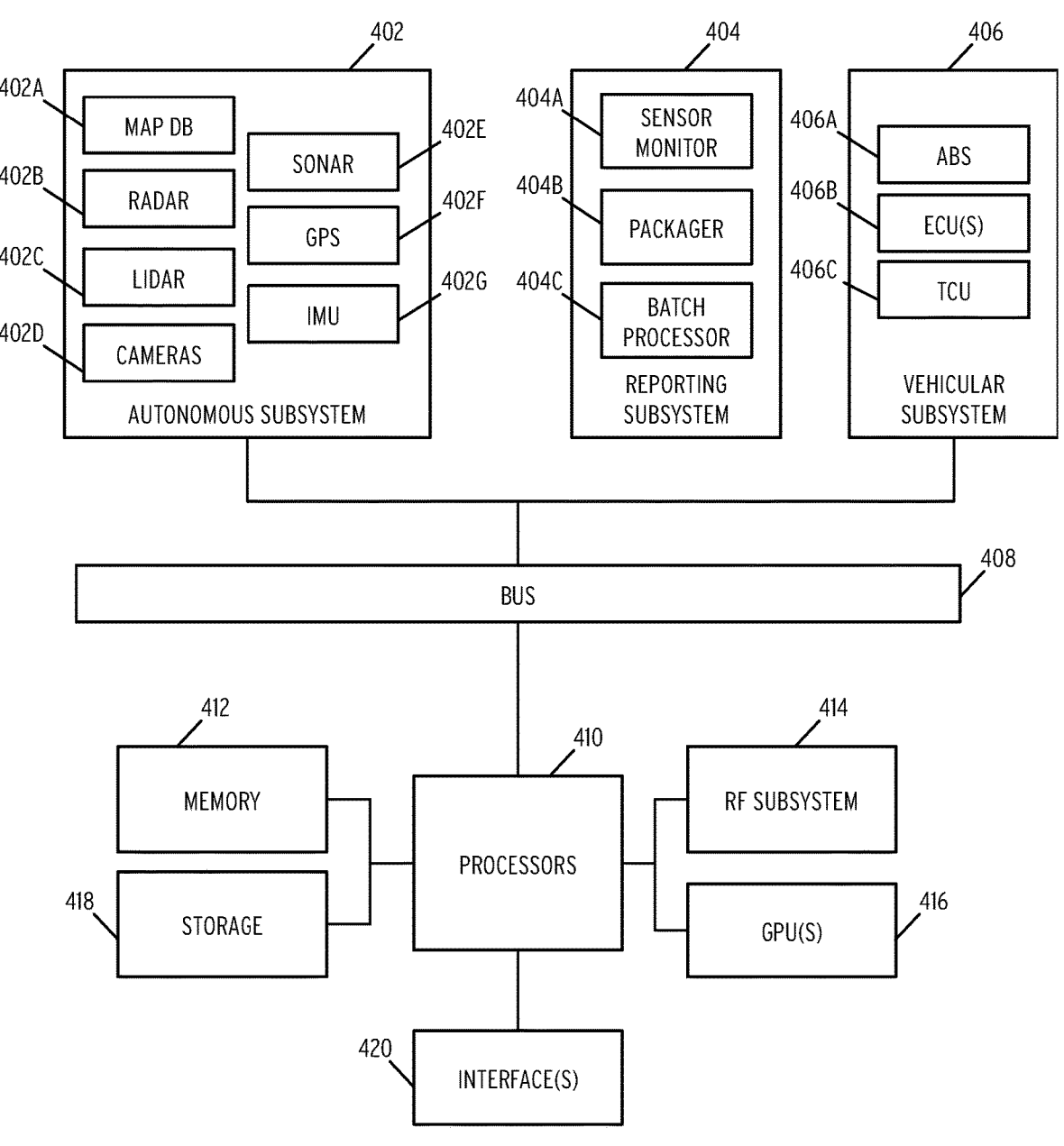
FIG. 7 is a block diagram of an autonomous vehicle including one or more various components and/or subsystems, each of which can be updated in various embodiments to configure the vehicle for an identified user.

FIG. 7 is a block diagram of an autonomous vehicle including one or more various components and/or subsystems, each of which can be updated in various embodiments to configure the vehicle for an identified user. Each of the various components and/or subsystems can be updated in various embodiments to configure the vehicle (e.g., based on configuration data, such as using a firmware update), as was described above. The system illustrated in FIG. 7 may be installed entirely within a vehicle.

The system includes an autonomous vehicle subsystem 402. In the illustrated embodiment, autonomous vehicle subsystem 402 includes map database 402A, radar devices 402B, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various anti-lock braking systems 406A, engine control units 402B, and transmission control units 402C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 8 below). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 8:
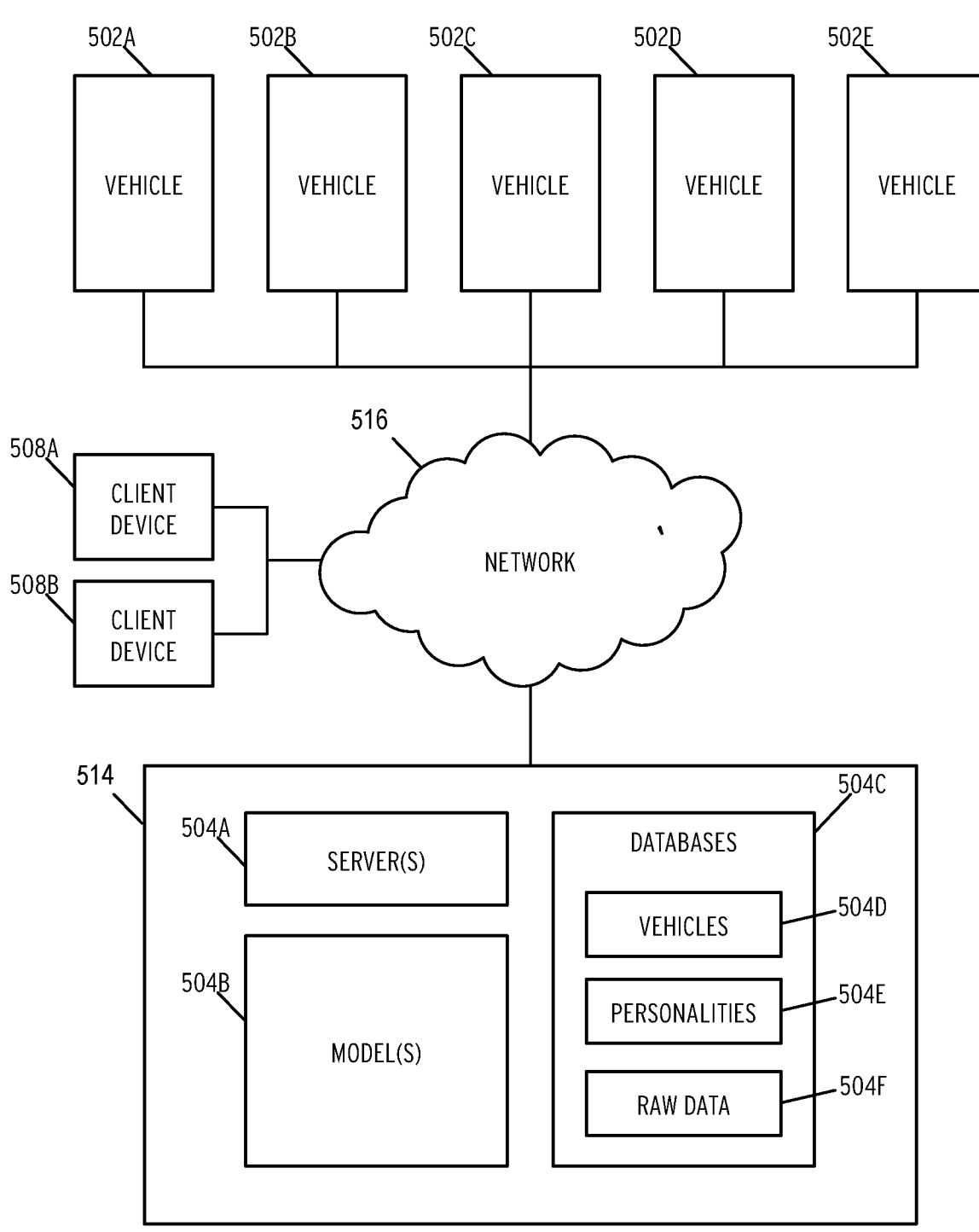
FIG. 8 is a block diagram of a centralized autonomous vehicle operations system, according to various embodiments.

FIG. 8 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 7. Each autonomous vehicle 502A-502E may communicate with a central system 514 via a network 516. In one embodiment, network 516 comprises a global network such as the Internet.

In one example, central system 514 is implemented using one or more of servers 101, 301, and/or 701. In one example, one or more of autonomous vehicles 502A-502E are autonomous vehicle 703.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models. Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform the various vehicle configuration methods described above, including data processing systems which perform these methods, and computer readable media containing instructions which when executed on data processing systems cause the systems to perform these methods.

Each of the server 101 and the computer 131 of a vehicle 111, . . . , or 113 can be implemented as one or more data processing systems. A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus comprising:

memory storing public user settings and private user settings to configure a vehicle for a user, wherein the private user settings are not sent to the vehicle until after the user is physically located in the vehicle; and a server configured to:

communicate, over a network, with a mobile device of the user;

receive, from the mobile device, permission to manage the public user settings, wherein the user specifies how to apply the public user settings to the vehicle prior to the user being physically located in the vehicle, wherein configuring the vehicle based on the public user settings comprises causing loading of the public user settings into the memory of the vehicle;

in response to receiving the permission to manage the public user settings, send the public user settings over the network to the vehicle for configuring the vehicle;

determine that the user is physically located in the vehicle;

identify the user;

in response to and after determining that the user is physically located in the vehicle and based on identification of the user, retrieve the private user settings from the mobile device of the user; and in response to and after retrieving the private user settings from the mobile device of the user, send the private user settings over the network to the vehicle for configuring the vehicle.

2. The apparatus of claim 1, wherein the identification of the user is required prior to configuring the vehicle based on the private user settings.

3. The apparatus of claim 1, wherein the private user settings are retrieved from the mobile device, and retrieval of the private user settings is prevented until an authenticated communications link with the mobile device is established.

4. The apparatus of claim 1, wherein the server is further configured to:

manage groups of user settings for respective users of vehicles, wherein one of the groups comprises the public user settings and the private user settings to configure the vehicle.

5. The apparatus of claim 1, wherein the server is further configured to, after sending the public user settings to the vehicle, receive permission from the mobile device to send the private user settings to the vehicle.

6. The apparatus of claim 1, wherein the server is further configured to generate an authorization for usage of the vehicle by the user, and wherein the public user settings are sent to the vehicle after generating the authorization.

7. The apparatus of claim 6, wherein the server is further configured to send an electronic notification regarding the authorization to the mobile device.

8. The apparatus of claim 1, wherein the server is further configured to receive, from the mobile device, a request for the vehicle, and wherein sending the public user settings to the vehicle is performed further in response to receiving the request.

9. The apparatus of claim 1, wherein the public user settings are included in firmware that is loaded into the memory of the vehicle.

10. The apparatus of claim 1, wherein the server is further configured to:

receive a notification regarding termination of usage of the vehicle by the user; and in response to receiving the notification, cause the vehicle to delete the private user settings from the memory of the vehicle.

11. An apparatus comprising:

memory storing public user settings and private user settings for a user, wherein the private user settings are not sent to a vehicle until after the user is physically located in the vehicle; and a server configured to:

receive permission from the user to manage the public user settings;

in response to receiving the permission to manage the public user settings, configure the vehicle using the public user settings, wherein configuring the vehicle based on the public user settings comprises loading of the public user settings into the memory of the vehicle;

after configuring the vehicle using the public user settings, determine that the user is physically located in the vehicle;

in response to and after determining that the user is physically located in the vehicle and based on identification of the user, retrieve the private user settings from a mobile device of the user; and in response to and after retrieving the private user settings from the mobile device of the user, send the private user settings to the vehicle to configure the vehicle using the private user settings.

12. The apparatus of claim 11, wherein the server is further configured to authenticate a computing device of the user, and wherein the private user settings are used to configure the vehicle only after authenticating the computing device.

13. The apparatus of claim 11, wherein the server is further configured to receive input provided via a user interface of a computing device of the user, the input to identify at least one setting of the user to include in the private user settings.

14. The apparatus of claim 11, wherein the server is further configured to display at least one symbol to the user when in the vehicle, the at least one symbol corresponding to the configuration of the vehicle using at least one of the public user settings or the private user settings.

15. The apparatus of claim 11, wherein the server is further configured to, after retrieving at least one of the public user settings or the private user settings, provide a notification via at least one of a computing device of the user or a display of the vehicle that at least one user setting is not supported by the vehicle.

16. The apparatus of claim 11, wherein the server is further configured to, prior to retrieving the private user settings, authenticate a computing device of the user, the authentication using at least one key stored on the computing device.

17. The apparatus of claim 11, wherein the user specifies how to configure the vehicle using the public user settings prior to the user being physically located in the vehicle.

18. A non-transitory computer storage medium storing instructions which, when executed on a computing device, cause the computing device to:

communicate, over a network, with a mobile device of a user;

receive, from the mobile device, permission to manage public user settings of the user;

in response to receiving the permission to manage the public user settings, send the public user settings to a vehicle for the user to configure the vehicle, wherein configuring the vehicle based on the public user settings comprises loading of the public user settings into a memory of the vehicle;

determine that the user is physically located in the vehicle;

in response to and after determining that the user is physically located in the vehicle and based on identification of the user, retrieve private user settings from the mobile device of the user;

receive the private user settings of the user; and in response to and after retrieving the private user settings from the mobile device of the user, send the private user settings to the vehicle to configure the vehicle, wherein access to the private user settings are not sent to the vehicle until after the user is physically located in the vehicle.

* * * * *